United States Patent [19]
Phipps

[11] Patent Number: 5,640,567
[45] Date of Patent: Jun. 17, 1997

[54] APPARATUS AND METHOD FOR SOFTWARE SYSTEM MANAGEMENT USING SECOND-ORDER LOGIC

[75] Inventor: Geoffrey R. Phipps, Palo Alto, Calif.

[73] Assignee: Sun Microsystems, Inc., Mountain View, Calif.

[21] Appl. No.: 246,111

[22] Filed: May 19, 1994

[51] Int. Cl.$^6$ .................................................. G06F 17/00
[52] U.S. Cl. ........................ 395/703; 395/701; 395/702; 395/50; 395/922
[58] Field of Search ........................ 395/700, 500, 395/55, 650, 703, 701, 702; 364/419.08

[56] References Cited

U.S. PATENT DOCUMENTS

| | | | |
|---|---|---|---|
| 5,159,687 | 10/1992 | Richburg | 395/700 |
| 5,257,363 | 10/1993 | Shapiro et al. | 395/500 |
| 5,274,820 | 12/1993 | Gillet | 395/700 |
| 5,274,821 | 12/1993 | Rouquie | 395/700 |
| 5,276,775 | 1/1994 | Meng | 395/55 |
| 5,321,606 | 6/1994 | Kuruma et al. | 364/419.08 |

OTHER PUBLICATIONS

"Formal Specification of Geographic Data Processing Requirements", Gruia–catalin Roman, IEEE Transaction on Knowledges and Data Engineering, vol. 2, No. 4, Dec. 1990.
Adams, Paul; "An Overview of the CAPITL Software Development Environment in Proceedings of the Fourth Software Configuration Management Workshop", Baltimore, Maryland, USA, May 21–22, 1993.
Chen, Weidong; "A Theory of Modules Based on Second–Order Logic", In Proceedings of the Symposium of Logic Programming, 1987.
Make; Sun Microsystems, Inc., "Make User's Guide", Progamming Utilities and Libraries, Chapter 5, Part No. 800–3847–10.

*Primary Examiner*—Kevin A. Kriess
*Assistant Examiner*—Majid A. Banankhah
*Attorney, Agent, or Firm*—Flehr Hohbach Test Albritton & Herbert LLP; William S. Galliani

[57] ABSTRACT

A software system manager to achieve second-order logical management of a software system model is described. The system relies upon a second-order logic system description that uses variable functors with specified import predicate arguments and export predicates. The second-order logical system description includes a second-order system model, a second-order rule set, and a second-order operation module. The second-order system model defines a set of existing program files, the second-order rule set defines a set of operations that can be performed on the existing program files, and the second-order operation module specifies an operation to be executed by the secondorder rule set on the set of existing program files. The second-order logic system description is used to generate a set of system construction commands. The system construction commands specify the commands necessary to transform the existing program files into intermediate object files that are used to produce an executable program.

15 Claims, 7 Drawing Sheets

56 ↘

Module system_model ( Import_Pred_Args:Export_Pred_Args )
{File_1

.
.

File_N refers_to( from, to )

.
.

refers_to( from_n, to_n )}

Module rule_set ( Import_Pred_Args:Export_Pred_Args )
{ Rule_1

.
.

Rule_N}

Module system_model ( Import_Pred_Args:Export_Pred_Args ) &
Module rule_set ( Import_Pred_Args:Export_Pred_Args )&
Predicate_Variable &
Built_In_Predicate

Figure 7

APPARATUS AND METHOD FOR SOFTWARE SYSTEM MANAGEMENT USING SECOND-ORDER LOGIC

BRIEF DESCRITPION OF THE INVENTION

This invention relates generally to the management of large software systems. More particularly, this invention relates to a software system manager employing variable functors with specified import predicate arguments and export predicate arguments to achieve second-order logical management of a software system model.

BACKGROUND OF THE INVENTION

Software system management tools define software elements, their interdependencies, and the rules that are required to construct a software product. These tools are necessary in view of the fact that a large software system typically includes a large number of individual source code programs that are compiled and then linked into a single executable program. This results in a number of software system management requirements. For example, a source code program may have a number of versions. Therefore, it is necessary to identify the proper version to be used in constructing the executable program. In addition, each source code program may require a distinct compiler. Thus, a mechanism must be developed to coordinate a source code program with the appropriate compiler. Software system management tools are also used to track program bugs. The most commonly used system modeler is MAKE®, which runs on the UNIX® operating system.

FIG. 1 illustrates a prior art software system management apparatus 20. The apparatus 20 includes a central processing unit 22 which communicates with a memory module 24 and a hardware user interface 26 through a bus 28. A user working at the hardware user interface 26 inputs a rule-based description of a software system, which is downloaded into memory module 24. The rule-based software configuration description 30 is an integrated description of software elements, their interdependencies, and the rules that are used to construct a final product.

The memory module 24 stores a number of executable programs including a software user interface 32 (such as a graphical user interface) and a rule execution engine 34, which produces system construction commands 36. The executable programs stored in the memory module 24 also include a tool controller 38, compilers 40, and linkers 42. The tool controller 38 receives the system construction commands 36 and existing program files 44. The tool controller 38 operates in conjunction with the compilers 40 and linkers 42 to execute the system construction commands 36 on the existing program files 44 to yield an updated executable program 46.

The processing associated with prior art software system management devices is more fully appreciated with reference to FIG. 2. The input data to the apparatus is a rule-based software configuration description 30, such as provided by MAKE®. The software user interface 32 receives this information and passes it to a rule execution engine 34, which produces a set of system construction commands 36. For instance, if the rule-based software configuration description 30 specifies that files A, B, and C are to be combined to form file D, then the system construction commands 36 would constitute a set of commands that could be executed by the tool controller 38 to compile and link existing files A, B, and C to form file D.

Thus, the tool controller 38 executes the system construction commands 36 by interacting with the compilers 40, linkers 42, and existing program files 44. After the tool controller 38 has executed the system construction commands 36, an updated executable program 46 is produced.

Some software system management tools, such as CAPITL (Computer Aided Programming In The Large; developed at the University of Wisconsin), rely upon first-order logic. First-order logic refers to first-order predicate calculus wherein facts may be expressed as a combination of a functor and an argument. For example, in the statement "dog(fido)", the term "dog" is a functor, while "fido" is an argument. Thus, a functor may be thought of as a general truth, while an argument is an instance of the general truth. In first-order predicate calculus, functors are constant, that is, a functor's value cannot change.

First-order logic is used to express relations between elements. For example, the statement "conn(X,Z) :- conn (X,Y) & conn(y,z)" indicates that there is a connection between X and Z if there is a connection between X and Y and between Y and Z. Thus, it can be appreciated that first-order logic may be used in software system management to express relations between different files. For example, first-order logic may be used to express a fact that one file must be compiled before a second file is compiled.

Some system modellers, such as MAKE®, do not use first-order logic, they use ad hoc rules. Ad hoc rules are less powerful than first-order logic. For example, using cad hoc rules, a transformation from A into B into C must be explicitly defined as a two step transformation A→B & →B→C. Ad hoc rules expressed in procedural statements of this type cannot automatically deduce the rules necessary to transform A into C. Therefore, existing software system management tools, such as MAKE®, require a programmer to produce a set of ad hoc rules that are used to explicitly define software elements, their interdependencies, and the rules required to construct an executable file.

It would be highly desirable to provide a software system management tool that automatically assesses file dependencies and executes file handling rules. Such a system would allow a user to merely specify a desired property for a file to be formed. Thereafter, the software system management tool would execute all of the logic to achieve the desired result. Specifically, the software system management tool would generate and run the necessary commands to produce the desired file.

Automatic assessment of file dependencies and execution of file handling rules can, in theory, be realized using second-order logic. As indicated above, in first-order logic, functors are constant. In second-order logic, functors can be variable. That is, a functor variable can represent any one of a number of functor constants. Thus, in the statement "A(X,Y)". The functor variable "A" is not limited to being a "dog", as in the first-order logic example above, it can also be a "cat", "horse", etc. Second-order logic can be defined as generalized logic, based upon first-order logic, that allows logical deductions to be made from arbitrary facts, relations, or rules. Thus, in the context of software system management, a second-order system would provide a mechanism for making logical deductions from arbitrary files, file relations, and file handling rules.

Second-order logic has not been applied to software system management in the past because it is computationally expensive. Since a variable functor could be any of an infinite number of arbitrary relations, the resultant search space is prohibitive. Limited second-order logic can be applied to software system management if the functors are confined (bounded) to a set of user-defined predicates.

However, this can still be an inherently limited approach. Moreover, without explicit separation of the import and export predicates, errors (e.g., in a second-order logic system description) can only be identified at execution time, not at compile time.

Thus, it would be highly desirable to provide a software modelling system that utilizes unbounded second-order logic, but does not have the execution penalties typically associated with unbounded second-order logic. Such a system would automatically define relations between files and generate commands to achieve a final product. Therefore, the user would not be forced to define all the relations between the files and the rules required to achieve a final product.

It would also be desirable to provide a software modelling system that can identify system errors at compile time. In particular, it would be desirable to provide a compile-time scope analysis. As understood in the art, scope is a rigorous framework of program code that limits the global visibility of program parts. Scoped information is only externally visible if it is explicitly exported by a defining module, and explicitly imported by the using module. Scoped information can only be imported into a module if it is exported by another module that it can see.

The following is a glossary of terms that will be used in the Detailed Description of the Invention.

Atom: An indivisible word or number, such as "dog" or "3". Words must begin with lower case letters.

Variable: An alphanumeric string that begins with an uppercase letter and can assume various values.

Term: A syntactic unit, either a simple atom, or a compound term, such as "dog(fido, brown)".

List: A set of terms enclosed within square brackets, e.g."[a, b, c]".

Functor: The head part of a compound term. For example, the functor of"dog(fido)" is "dog". In second-order logic, functors can be variables, for example "V(X, dog)". Functors define a general truth.

Arguments: The terms inside the parenthesis of a compound term, for example the arguments of"a(p(q),C)" are "p(q)" and "C". Arguments are parameters associated with a functor.

Ground: A ground term contains no variables. A ground functor is an atom, not a variable.

Rule: A logical statement of the form "X is true if Y and Z are true". It is written "X←Y & Z". The first part, X, is called the head. The remainder, Y & Z, is known as the body. Each term in the body is known as a subgoal.

SUMMARY OF THE INVENTION

A software system manager to achieve second-order logical management of a software system model is described. The system relies upon a second-order logic system description that uses variable functors with specified import predicate arguments and export predicate arguments. The second-order logical system description includes a second-order system model, a second-order rule set, and a second-order operation module. The second-order system model defines a set of existing program files, the second-order rule set defines a set of operations that can be performed on the existing program files, and the second-order operation module specifies an operation to be executed by the second-order rule set on the set of existing program files. The second-order logic system description is used to generate a set of system construction commands. The system construction commands specify the commands necessary to transform the existing program files into intermediate object files that are used to produce an executable program.

BRIEF DESCRIPTION OF THE DRAWINGS

For a better understanding of the nature and objects of the invention, reference should be made to the following detailed description taken in conjunction with the accompanying drawings, in which:

FIG. 5 illustrates the data structure for the second-order system model of the invention.

FIG. 6 illustrates the data structure for the second-order rule set of the invention.

FIG. 7 illustrates an example second-order system query to be executed in accordance with the invention.

Like reference numerals refer to corresponding parts throughout the several views of the drawings.

DETAILED DESCRIPTION OF THE INVENTION

Figure 1:
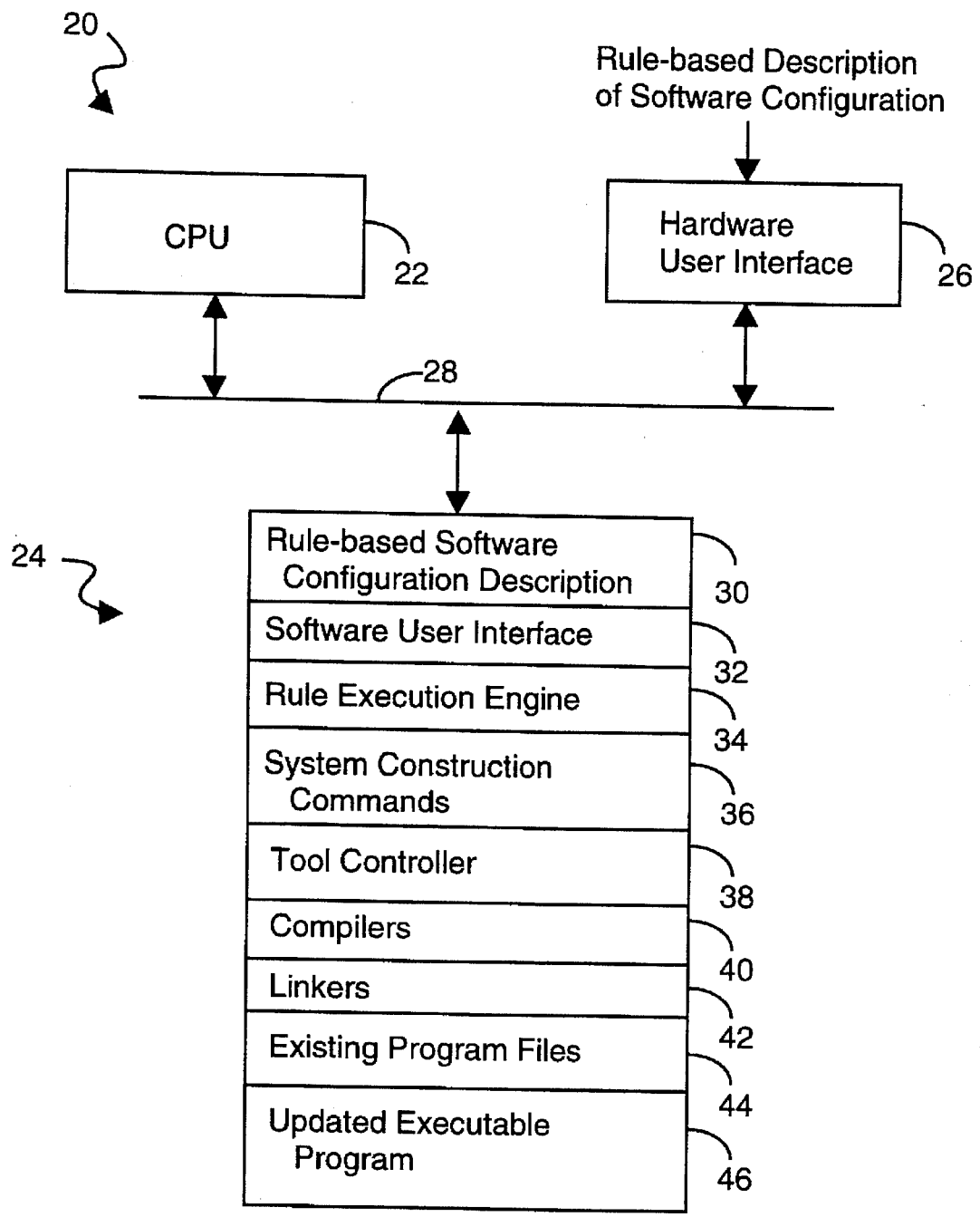
FIG. 1 is a prior art software system management apparatus that executes a rule-based description of a software model.
Figure 2:
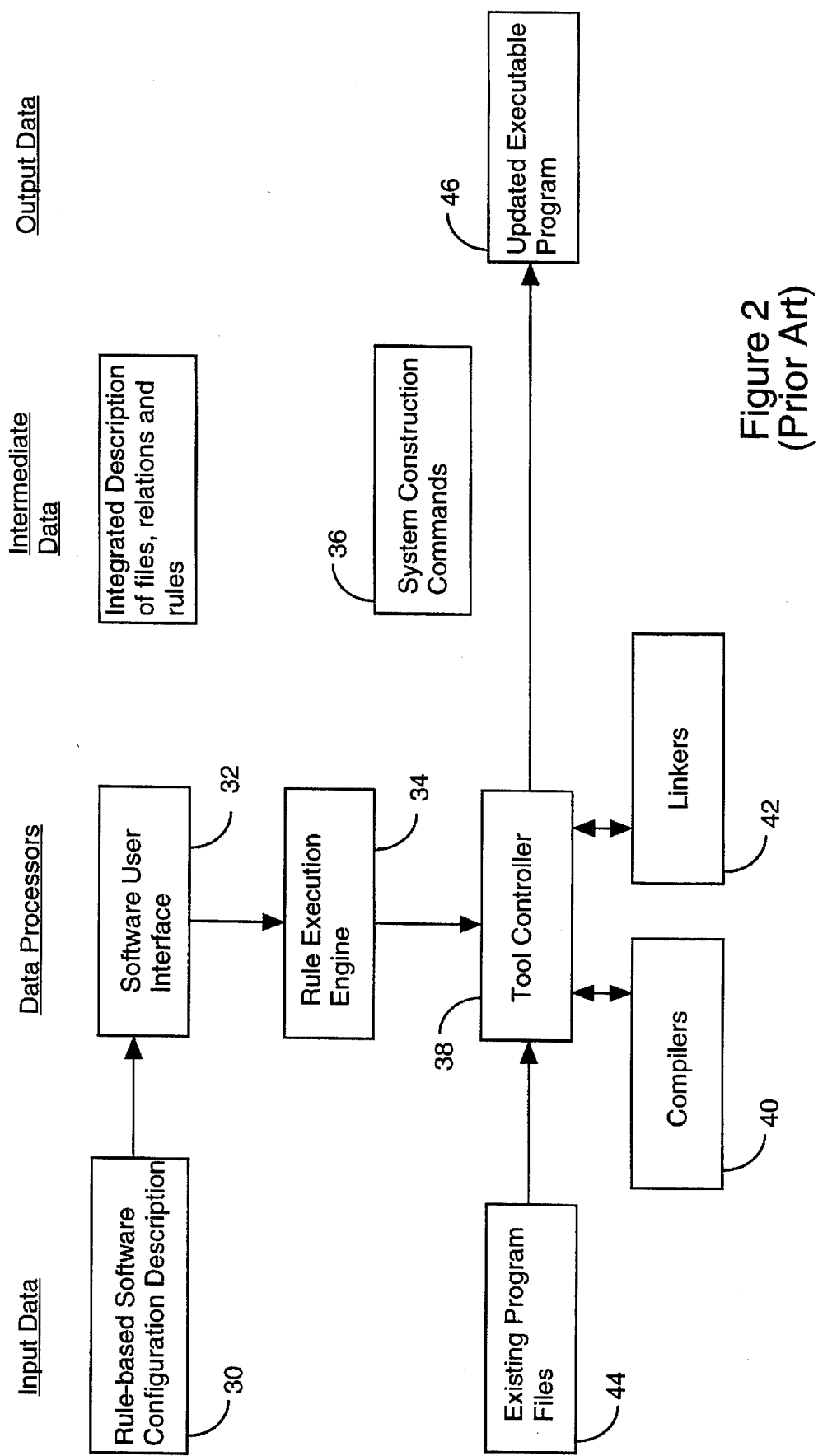
FIG. 2. illustrates the processing associated with the prior art software system management apparatus of FIG. 1.
Figure 3:
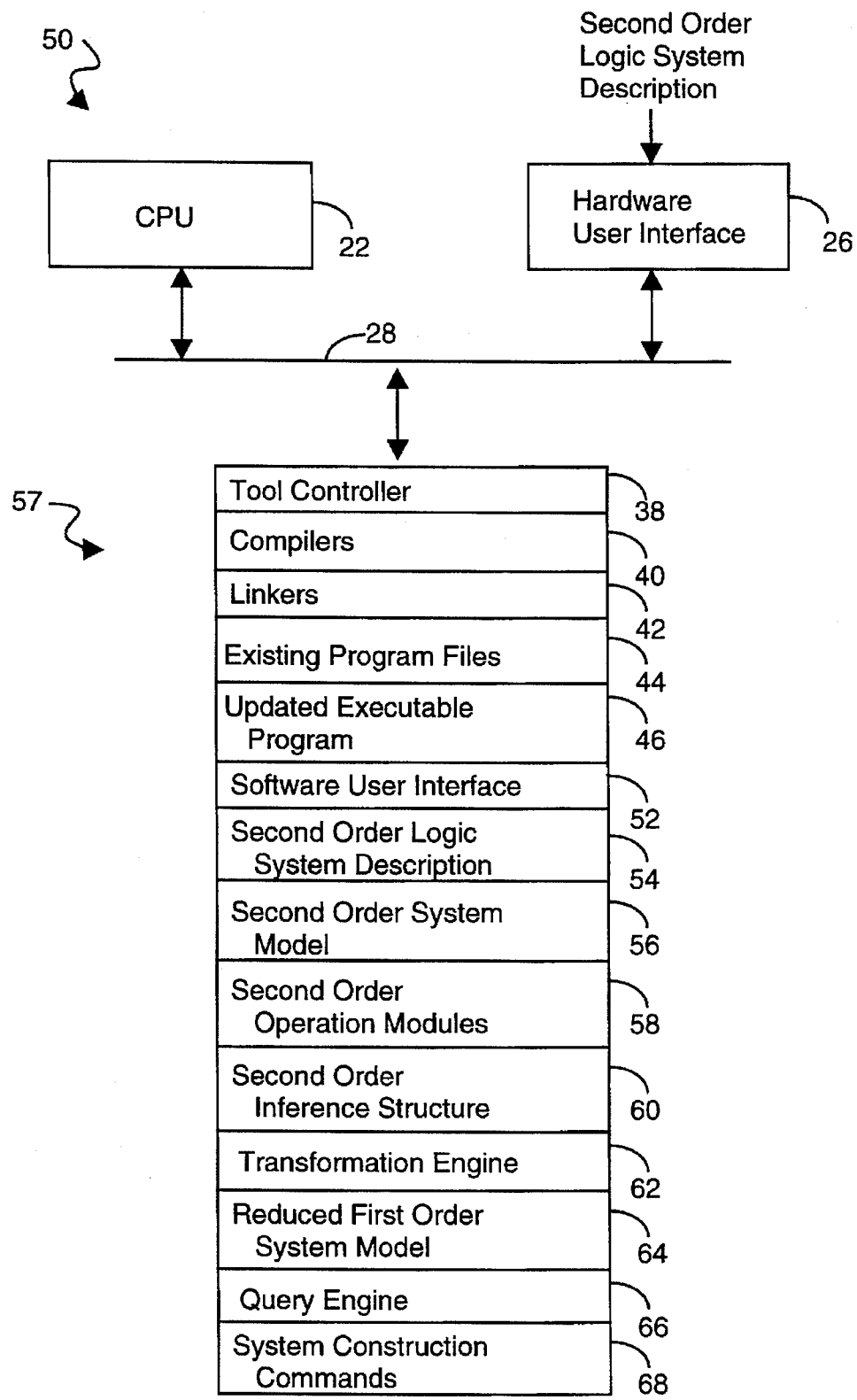
FIG. 3 is a software system management apparatus, in accordance with the invention, using second-order logic.

FIG. 3 illustrates the software system management apparatus 50 of the present invention. Several elements associated with the apparatus 50 are the same as those of the prior art apparatus 20 illustrated in FIG. 1. These elements are identified with identical reference numbers. The apparatus of FIG. 3 is unique in the following respects. First, a second-order logic system description 54 is entered by a user at the hardware user interface 26. The hardware user interface 26 runs a software user interface 52, as will be discussed below, that supports the second-order logic system description 54. The second-order logic system description 54 is downloaded into memory 57. Memory 57 also includes the following novel elements: a second-order system model 56, second-order operation modules 58, a second-order inference structure 60, a transformation engine 62, a reduced first-order system model 64, and a query engine 66.

Figure 4:
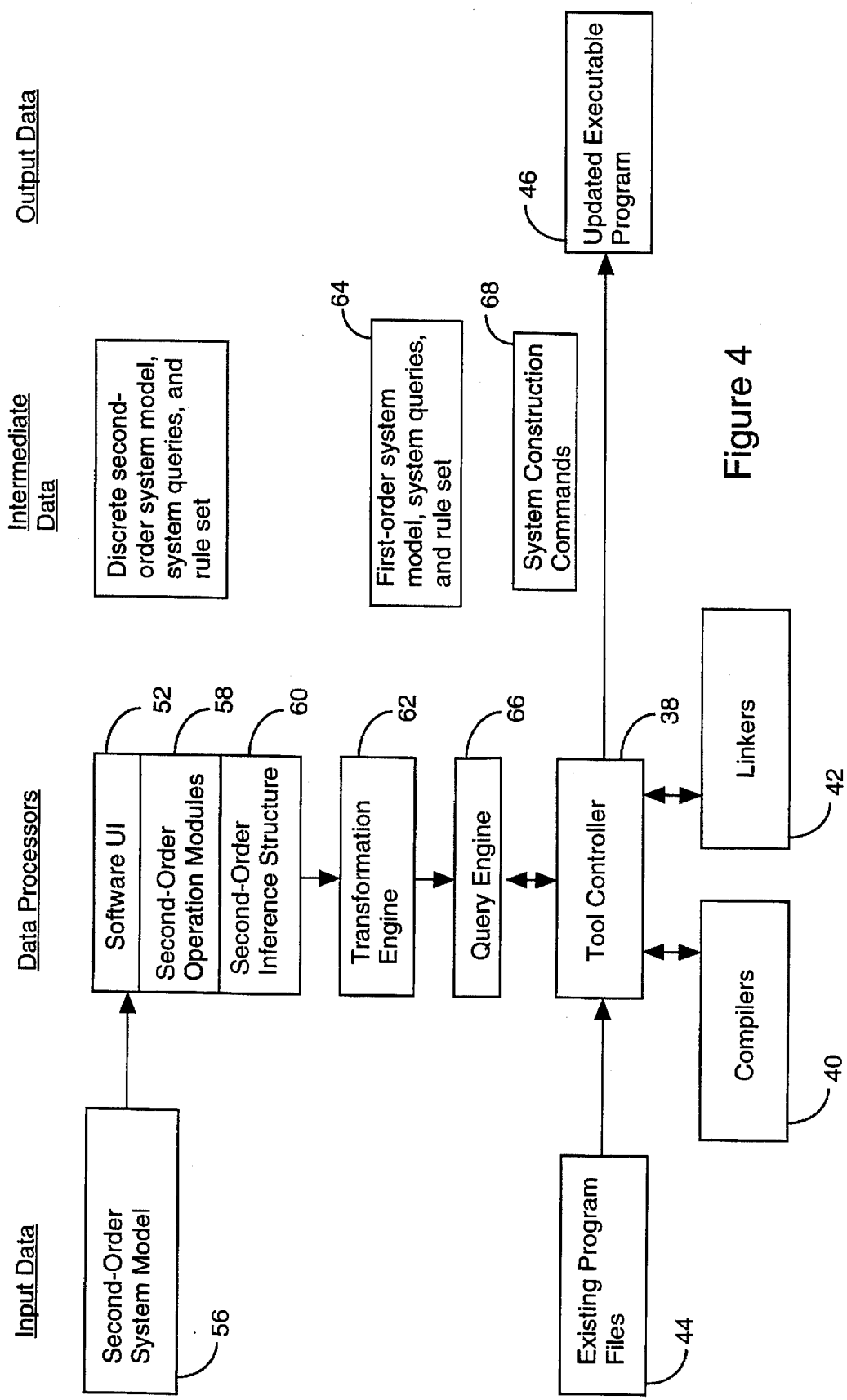
FIG. 4 illustrates the processing associated with the software system management apparatus of FIG. 3.

The operation of the apparatus of FIG. 3 is illustrated in FIG. 4. A second-order system model 56 is supplied to a software user interface 52. The second-order system model is a second-order description of fifes and their interdependencies. The software user interface 52 supports second-order operation modules 58 by displaying these modules on the hardware user interface 26. The second-order operation modules 58 define different types of operations that can be performed on a software system. Example operations include showing the dependencies between files, exhibiting different file versions, and making necessary compilations to execute a system model. Preferably, each operation has a corresponding icon that can be selected. The software interface 52 interacts with a second-order inference structure 60, which is a second-order rule set that defines the actions that are necessary to achieve the operations defined in the second-order operation modules 58.

In sum, when the data processing of the invention commences there are three discrete elements associated with the second-order logic system description 54. Specifically, there is the second-order system model 56, the second-order operation modules 58, and the second-order inference structure 60.

Note that prior art rule-based software configuration descriptions constitute an integrated description of the files, file interdependencies, and rules to generate system information or an updated program. Note also that in the prior art rule-based software configuration system, the user is required to generate the complete description of the files, file interdependencies, and rules. In contrast, the user of the present invention only has to select a second-order operation module 58 and invoke a second-order system model 56. The second-order system model 56 may be keyed in at the user interface 26 or it may be obtained from the system 50 itself. That is, the existing program files 44 of the system 50 may simply be displayed on the hardware user interface 26 that is running the software user interface 52 and then selected to form the second-order system model 56.

The second-order logic system description 54 of the invention is applied to a query engine 66. The query engine 66 uses the second-order inference structure 60 to run the second-order operation modules 58 on the second-order system model 56. This operation produces a set of system construction commands 68. As with the apparatus of FIG. 1, the system construction commands 68 are executed by the tool controller 38, which interacts with the compilers 40, the linkers 42, and the existing program files 44, to produce an updated executable program 46.

While the second-order logic system description 54 may be directly interpreted by a query engine 66, it is preferable to convert the second-order logic system description 54 into intermediate code for execution on a query engine in the form of a relational engine. Such an operation is described in Geoffrey Phipps, *Glue: A Deductive Database Programming Language*, Ph.D. thesis, Stanford University, Stanford, Calif., 1992. Department of Computer Science Report No. STAN-CS-92-1460, and Marcia A. Derr, *Adaptive Optimization In A Database Programming Language*, Ph.D. thesis, Stanford University, Stanford, Calif., 1992. Department of Computer Science Report No. STAN-CS-92-1460. In addition, the second-order logic system description 54 may be transformed into a textual first-order description which is then interpreted by the query engine 66. In one embodiment of the invention described below, the second-order logic system description 54 is transformed into the textual first-order description widely known as PROLOG. Thereafter, the first-order description is applied to a standard PROLOG interpreter. Thus, FIG. 4 illustrates that the second-order logic system description may be passed to a transformation engine 62 that produces a first-order logic system description 64, which includes a first-order system model, system queries, and a rule set.

The foregoing overview of the invention as described in relation to FIG. 4 generally illustrates that the process of the invention entails using a second-order logic system description to achieve software system management. The system of the invention replaces ad hoc rule systems, associated with first-order logic, with a second-order logic system that allows logical deductions to be made from arbitrary files, file relations, and file handling rules. It can be appreciated that instead of providing a rule-based description of the software configuration, the user of the system only needs to specify a second-order system model and then select a second-order operation to achieve a useful result, such as an updated executable program 46. The second-order inference structure 60 of the invention operates transparently to the user to perform the operations that are normally specifically specified by a user through a rule-based description.

Attention is presently directed toward the features of the invention that facilitate the second-order logic software system management apparatus and method of the invention. Thereafter, attention turns to specific implementations of the invention.

As indicated in the background section, with second-order logic, functors are variable. The present invention has variable functors. However, to provide a limited search space, import predicate arguments and export predicate arguments for each variable functor are specifically declared. Thus, the second-order system model 56 includes specifically declared import predicate arguments and export predicate arguments. Similarly, the second-order inference structure 60 includes a set of rules that operate on import predicate arguments and produce export predicate arguments. In addition, the second-order operation modules 58 use variable functors with import predicate arguments and export predicate arguments to specify desired software system management functions. Thus, the software system management method of the invention utilizes scope. That is, scoped information within the system is only externally visible to the entire system if the information is explicitly exported by a defining module and explicitly imported by a using module. The scoped information of the invention allows a compile time analysis of the defined second-order logic system description. That is, by simply checking the declared import predicate arguments and export predicate arguments, errors can be identified at compile time.

The specified import predicate arguments and export predicate arguments of the invention enable a second-order logic software system management method. Consequently, a rule-based procedural description of the software configuration is not required. That is, the second-order logic allows generalized logical deductions to be made based simply upon the second-order system model 56. These concepts are more fully appreciated with references to the specific embodiments of the invention described below.

FIG. 5 illustrates a data structure for the second-order system model 56 of the invention. The system model includes declared import predicate arguments that are separated by a colon from declared export predicate arguments. The body of the module includes a first set of file statements that declare files 1 through N. The body also declares a set of "refer_to" facts that express relationships between files. The "from" file has a reference to the "to" file.

FIG. 6 illustrates a data structure for the second-order inference structure 60 of the invention. The rule set includes declared import predicate arguments that are separated by a colon from declared export predicate arguments. The body of the module includes rules 1 through N. The import predicate arguments are applied to the rules to produce export predicate arguments.

FIG. 7 illustrates an example of a second-order operation module 58 of the invention. The operation modules of the invention may be thought of as queries that result in system operations. The modules specify a query. The answer to the query is a desired property for a file. The second-order system model 56 describes the available files and the second-order inference structure 60 establishes the operations that may be used to obtain the desired file. In the example of FIG. 7, the system model is declared, the rule set is declared, a predicate variable is declared, and a built-in predicate is called. The predicate variable is simply a variable and the built-in predicate is an operation native to the environment. Built-in predicates are simple logical operations, such as "=" and "!=" (not equal).

The generalized data structures shown in FIGS. 5 through 7 are more fully appreciated with reference to specific examples. The following code is an example of a second-order system model.

```
(1)     module system_model( :file, refers_to ) {
(2)         file( t1 ).
(3)         file( t2 ).
(4)         file( t3 ).
(5)         file( t4 ).
(6)         file( t5 ).
(7)         refers_to( t1, t2 ).
(8)         refers_to( t2, t4 ).
(9)         refers_to (t4 ,t4 ).
(10)        refers_to( t1, t3 ).
(11)        refers_to( t3, t4 ).
(12)        refers_to( t3, t5 ). }
```

Figure 8:
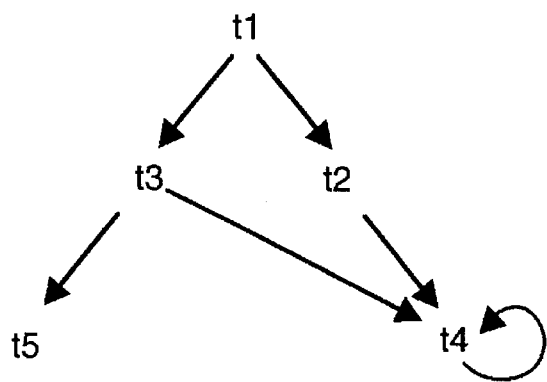
FIG. 8 is a file relation graph corresponding to an example system operation described below.

Note that in line 1 the module system_model does not have any import predicate arguments, but has export predicate arguments "file" and "refers_to". Lines 2 through 6 define five different files (t1, t2, t3, t4, t5), and lines 7 through 12 define relations between those files. For example, line 7 indicates that file t1 produces file t2. Line 8 indicates that file t2 produces file t4. FIG. 8 illustrates the relationships defined in lines 7 through 12.

The following code is an example of a second-order inference structure.

```
(13)    module rule_set( node, edge:path ) {
(14)        path( X, X ) <- node( X ).
(15)        path( X, Z ) <- edge( X, Y ) & path( Y, Z ). }
```

Line 13 expresses that the import predicate arguments for the module are "node" and "edge", while the export predicate is "path". Line 14 expresses the rule that there is a path between X and X if X is a node. Line 15 expresses the rule that there is a path between X and Z if there is an edge between X and Y, and there is a path between Y and Z.

Note that the predicate variable "path" is written with a lower case letter. This is to distinguish it from ordinary variables, such as X. Ordinary variables have the scope of a single rule, predicate variables have the scope of the entire module. Whenever the module is used in another module or rule, the module's import variables must be given real values. The module then provides a definition for its export predicate arguments based on these import definitions.

The second-order system model may be combined with the second-order inference structure to produce a query or operation. That is, the second-order system model and the second-order inference structure are used to produce a second-order operation module that specifies an operation to be performed or a query to be answered. An example of a second-order inference structure follows.

```
(16) module system_model( :F, I ) &
(17) module rule_set( F, I:Uses ) &
(18) Uses( X, Y ) &
(19) X != Y
```

Lines 16 and 17 combine the second-order system model and the second-order inference structure. Note in line 16 that the export predicate arguments are defined as "F" and "I" which serve as import variables to the inference structure of line 17. The export predicate of the inference structure is "Uses". Line 18 establishes that predicate variable "Uses" has arguments that are variables "X" and "Y". Line 19 is an example of a built-in predicate that states that "X" cannot equal "Y".

Note that the rules within a module have the same meaning as they do in standard first-order logic, except for the scope of predicate names and the meaning of predicate variables. Predicate names are only visible within their defining module, unless they are explicitly exported from one module and imported into another. In the foregoing example, the predicate "file" is exported from "system_model" via the variable "F", and is imported into "rule_set" via the same variable. Thus, the variable F is bound to the value "file". Predicate names are implicitly extended by the name of their defining module. Hence, predicate "file" is really predicate "system_model:file". Whenever a predicate name is used in a subgoal, it is compared with the set of predicate names visible at that point in the program. This operation must be performed at run time.

Figure 9:
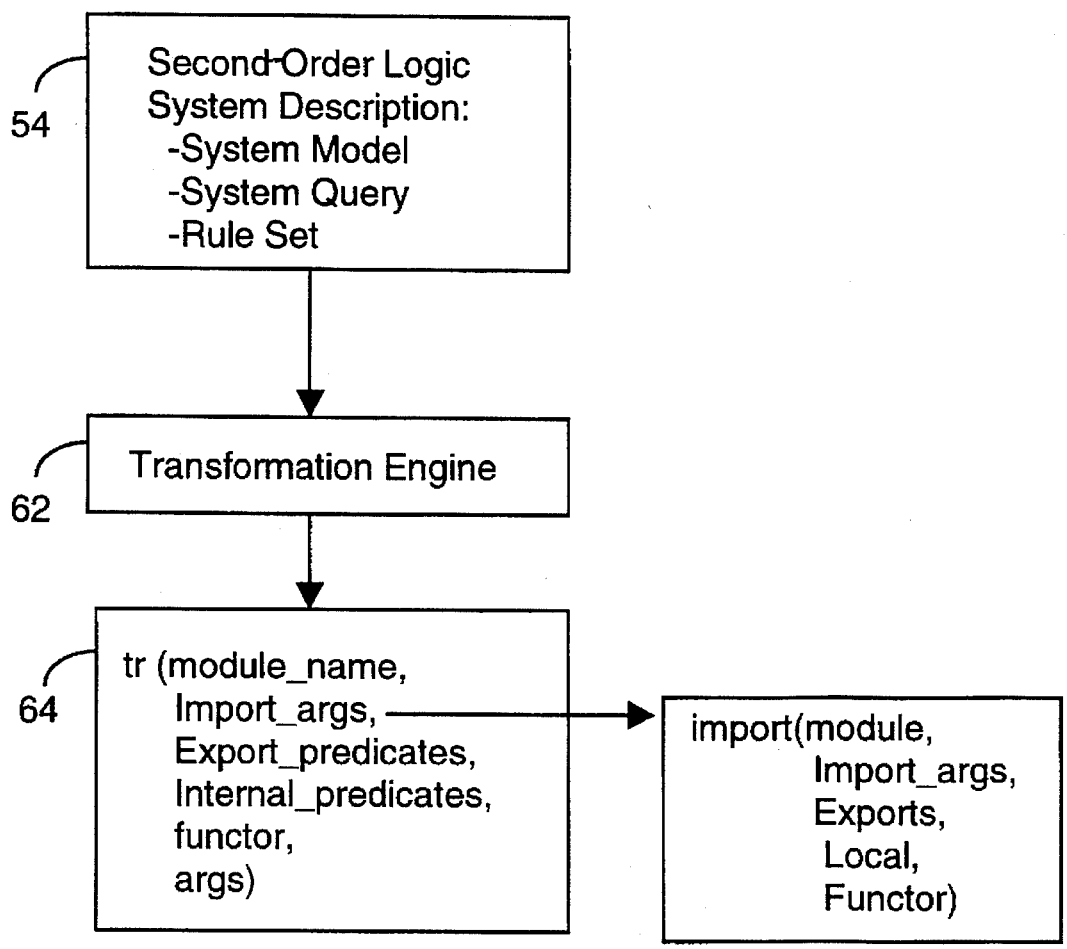
FIG.9 illustrates the first-order logic data structure that is used to express the second-order system model of the invention.

The second-order system model 56, the second-order operation module 58, and the second-order inference structure 60 of this example may now be applied to a transformation engine 62, as shown in FIG. 4. To illustrate the invention, the elements of the foregoing example will be transformed to a first-order textual format that is suitable for use with a PROLOG interpreter. This operation is illustrated in FIG. 9. However, as indicated above, a first-order textual format is not necessary to the invention, nor is any type of conversion to first-order logic necessary.

The following data structure may be used to express the second-order logic description of the invention in first-order logic.

```
(20) tr( Module_name, Import_args, Export_predicates,
         Internal_predicates, Functor, Args )
```

The argument "Module_name" is the name of the module. If module A is nested inside module B, then the name used is B:A. The names are extended based on the textual nesting of the modules, so it is easily determined and finite. The term "Import_args" is a list of import structures. It is the same length as the formal import predicate arguments to the module. This structure is used at run time to hold the actual bindings for the import predicate variables. A specific import structure is described below. "Exports" is a list of formal export predicate variables. It is identical to the list of formal export parameter variables. The term "Internal$_{13}$ predicates" is a list of the names of the predicates that are defined within the module, but are not exported. The reference to "Functor" expresses the functor of the original term. If the original functor was variable, then "Functor" will also be variable. The term "Args" identifies a list of the arguments in the original term.

The transformation data structure may be applied to the foregoing example of a system model to produce the following code.

```
(30) tr( system_model, [ ], [file,refers_to], [ ],
         file, [t1] ).
(31) tr( system_model, [ ], [file,refers_to], [ ],
         file, [t2] ).
(32) tr( system_model, [ ], [file,refers_to], [ ],
         file, [t3] ).
```

-continued

```
(33) tr( system_model, [ ], [file,refers_to], [ ],
        file, [t4] ).
(34) tr( system_model, [ ], [file,refers_to), [ ],
        file, [t5] ).
(35) tr( system_model, [ ], [file,refers_to], [ ].
                                refers_to, [t1,t2] ).
(36) tr( system_model, [ ], [file,refers_to], [ ],
                                refers_to, [t1,t3] ).
(37) tr( system_model, [ ], [file,refers_to] [ ],
                                refers_to [t2,t4] ).
(38) tr( system_model, [ ], [file,refers_to], [ ],
                                refers_to, [t3,t4] ).
(39) tr( system_model, [ ], [file,refers_to], [ ],
                                refers_to, [t4,t4] ).
(40) tr( system_model, [ ], [file,refers_to], [ ],
                                refers_to, [t3,t5] ).
```

Line 30 corresponds to line 2 above. Note that the first argument of "tr" defines the module name as "system_model". The second argument is empty (signified by []) since there are no import predicate arguments to the system_model (as shown at line 1 above). The next argument identifies "file" and "refers_to" as export predicate arguments. Since there are no internal predicates in the forgoing example, the next field is empty. The next field identifies the functor as "file". The final field identifies the original argument for line 2; that is, the final field identifies the argument "t1". Lines 31–40 similarly convert lines 3 through 12.

To transform the second-order inference structure 60 defined above at lines 13–15, an additional data structure is required. Specifically, an import data structure must be defined. A suitable structure is shown in FIG. 9 and at line 41.

```
(41) import( Module, Import_args, Exports, Local,
              Functor )
```

In this structure, "Module" is the name of the module that defined the predicate that is being imported. That module is known as the "defining module". "Import_args" are the import predicate variables to the defining module. "Exports" are the export arguments from the defining module. The term "Local" establishes the local predicates of the defined module. Finally, "Functor" is the predicate functor. Using this import structure, lines 13–15 are converted as follows.

```
(50)  tr( rule_set,
(51)       [import( DNm, DNi, DNe, DN1, Node ),
(52)        import( DEm, DEi, DEe, Del, Edge ) ],
(53)       [path], [ ], path, [X,X]
(54)  ) :-
(55)  tr( DNm, DNi, DNe, DN1, Node, [X] ).
(56)  tr( rule_set,
(57)       [import( DNm, DNi, DNe, DN1, Node),
(58)        import( DEm, DEi, DEe, DE1, Edge)],
(59)       [path], [ ],path,[X,Z],
(60)  ) :-
(61)  tr( DEm, DEi, DEe, DE1, Edge, [X,Y] ),
(62)  tr( rule_set[import( DNm, DNi, DNe, DN1, Node ),
(63)        import( DEm, DEi, DEe, DE1, Edge ) ],
(64)       [path], [ ], path, [Y,Z]).
```

Line 50 shows the "tr" subgoal and that the module name is "rule_set". At line 51, the "Import_args" field is substituted with the "import" data structure shown at line 41. Line 51 specifically shows an import data structure for the import argument "Node" of the "rule_set" module. These variable names have mnemonic meanings in this example. Thus, DNm is the Dynamic Node Module, because it holds the dynamic value of the module that defines the predicate "node". The general format is DXY: the dynamic value of the Y argument to the module that defines predicate X.

Line 52 shows an import data structure for the import argument "Edge". The first term at line 53 indicates that the export predicate is "path". The second term at line 53 is empty because there are no internal predicates in the "rule_set" module. The third term at line 53 indicates that "path" is the functor for this rule. The final term at line 53 declares that the arguments for "path" are "X,X" (see line 14). Line 54 describes the "if" term of line 14. Line 55 transforms the "node(x)" term of line 14 into the described first-order data structure. Lines 56 through 64 follow the same format in converting the statements of line 15.

The second-order operation module shown at line 16 may be transformed as follows:

```
(70)  tr( rule_set,
(71)       [import( system_model, [ ], [F,I], [ ], F),
(72)        import( system_model, [ ], [F,I] ,[ ], I)],
(73)       [Uses], [ ], Uses, [X,Y]),
(74)  X != Y.
```

The module name is "rule_set" because that is the module that defines the predicate represented by the variable "Uses". The import predicate arguments define the calling environment for that instance of "rule_set" which in this case is the exported variables from module "system_model". The two module calls in the query do not translate to actual "tr" predicates, instead they define the "import_args" on subsequent "tr" predicates. Therefore, there is only one "tr" predicate. The term "X!=Y" is a built-in predicate that may be directly used in first-order logic.

It should be noted that the foregoing example demonstrates all transformation possibilities. It can be logically proved that there are five transformation cases associated with the second-order logic system of the invention: (1) local and exported predicate calls with a ground functor, (2) imported predicate calls with a ground functor, (3) module calls, (4) calls of a subgoal with a nonground functor, and (5) calls of a built-in predicate. Case (1) is shown at lines 62–64, case (2) is shown at line 55, cases (3) and (4) are shown at lines 70–73. Case (5) is shown at line 74.

Thus, an example has been provided of a second-order logic system description 54, including a second-order system model 56, a second-order operation module 58, and a second-order inference structure 60. An example has also demonstrated how a transformation engine can be used to place the second-order logic system description in a first-order logic data structure. The first-order logic data structure is then applied to a query engine 66, which in this case is a standard PROLOG interpreter. Processing at this juncture is a straight-forward first-order logic operation. To show some of the run-time values for the data structure of the invention, the following lines of code are provided.

```
(75)  tr( rule_set,
(76)       [import( system_model, [ ], [file,refers_to],
(77)                [ ], file ),
(78)        import( system_model, [ ], [file,refers_to],
(79)                [ ], refers_to ) ],
(80)       [path], [ ], path, [X,X]
(81)  ) :-
(82)  tr( system_model, [ ], [file, refers_to], [ ],
(83)                file, [X] ).
```

These lines correspond to lines 50–55. Note that the import data variable "DNm" has assumed the value "system_model". The import predicate arguments "DNi" are empty because "system_model" does not have any import predicate arguments. The exports field "DNe" defines "file,refers_to". The local field is empty. The functor "Node" is replaced by the functor "file". Similar transformations are made at lines 78–83.

In the present example, the query engine 66 would process the first-order logic description provided above to produce a list of files with interdependencies. However, since "X!=Y", the interdependencies must be to another file (a file cannot depend upon itself). The following output is produced.

|      | X  | Y  |
|------|----|----|
| (84) |    |    |
| (85) | t1 | t2 |
| (86) | t1 | t4 |
| (87) | t1 | t3 |
| (88) | t1 | t5 |
| (89) | t2 | t4 |
| (90) | t3 | t5 |
| (91) | t3 | t4 |

This information regarding file dependencies constitutes system construction commands that are passed to the tool controller 38. The tool controller 38 uses the system construction commands in conjunction with other operations it is performing to produce an updated executable program 46. It should be noted that the system construction commands can be displayed through the user interface 26. Therefore, the apparatus 50 of the invention is used to produce an updated executable program 46, but may also be used to provide a user with software system management information.

To more fully illustrate the invention, another example will be provided. This example uses files and logic from an existing system. The second-order system model 56 is defined as follows.

```
(100)module src( : is, date ) {
(101)     is( 'cli.c', c_file ).
(102)     date( 'cli.c', 732486691 ).
(103)     is( 'Unix.h', h_file ).
(104)     date( 'Unix.h', 732487804 ).
(105)     is( 'Unix c', c_file ).
(106)     date( 'Unix.c', 732326484 ).
(107)     is( 'aa.y', yacc_file ).
(108)     date( 'aa.y', 732320091 ).
(109)     is( 'aa.h', h_file ).
(110)     date( 'aa.h', 732475330 ).
(111)     is( 'bb.1', lexfile ).
(112)     date( 'bb.1', 731877729 ).
(113)     is( 'cli.o', o_file ).
(114)     date( 'cli.o', 732487744 ) . }
```

This module defines existing files in a computer system. Note that the module has two export predicate arguments "is" and "date". Each file is declared with an "is" functor. The arguments for each "is" functor include a file name, for instance, "cli.c" at line 101, and the identification of the file type. The "cli.c" file at line 101 is a standard "C" language file. Each file has a corresponding date that is declared in a "date" functor. For example, at line 102 one argument identifies the "cli.c" file and the other argument provides a date for the last work on the file (given in seconds from 1970). Line 103 identifies an "h_file" which is a header file that includes "C" file definitions. Line 107 identifies a "yacc_file" (Yet Another Compiler Compiler file, YACC®is a registered trademark of AT&T). Line 111 identifies a "lexfile", which is a lexical analyzer. Line 113 identifies an "o_file" which is an object file.

The following code represents another module describing a system model. In particular, the following code describes which compilers are to be used and the parameters to be associate with those compilers.

```
(120)module environment( : env, env_control ) {
(121)     env( cc, '/bin/acc' ).
(122)     env( cflags, '-Xs -g' ).
(123)     env( ld_flags, '-lce -ldl' ).
(124)     env( target_name, cli ).
(125)     env_control( cc, override ).
(126)     env_control( cflags, override ).
(127)     env_control( ld_flags, union ).
(128)     env_control( target_name, override ) . }
```

Note that the module has two export predicate arguments "env" and "env_control". Lines 121–124 define "C" compilers and the flags to be used with the compilers. Lines 125–128 describe how the flags should be passed to other build (compilation) environments.

A second-order inference structure 60 is demonstrated with the following code.

```
(150)module stdc( env_in, env_control, is_in, date_in:
(151)     is, date, derivation, set ) {
(152)     env( Name, Value )<-
(153)         env_control( Name, Union ) &
(154)         (env_in( Name, Value ) |
              env_local( Name, Value ) ).
(155)     env( Name, Value )<-
(156)         env_control( Name, local ) &
(157)         env_local( Name, Value ).
(158)     env( Name, Value )<-
(159)         env_control( Name, override ) &
(160)         env_in( Name, Value ).
(161)     is( Name, Type )<-
(162)         is_in( Name, Type ).
(163)     env_local( ld_flags, '-ly' )<-
(164)         is( _, yacc_file ).
(165)     env_local( ld_flags, '-ll' )<-
(166)         is( _, lex_file ).
(167)     date( Name, Date )<-
(168)         date_in( Name, Date ).
(169)     date( Name, O ) <-
(170)         derived ( Name ) &
(171)         !date_in( Name , _ ).
(172)     derived( Name )<-
(173)         is( Name, o_file ).
(174)     derived( Name )<-
(175)         is( Name, bin_file ).
(176)     derived( 'y.tab.c' )<-
(177)         is( 'y.tab.c', c_file ).
(178)     derived( 'lex.yy.c' )<-
(179)         is ( 'lex.yy.c', c_file ).
(180)     is( Bin, bin_file )<-
(181)         env( target_name, Bin ) &
(182)         derivation( narrow, ogroup, Bin, _ ).
(183)     derivation( narrow, ogroup, Bin, Command)<-
(184)         set( ogroup, O ) &
(185)         OO=O // ' ' &
(186)         env( target_name, Bin ) &
(187)         env( ld_flags, Flags ) &
(188)         FF=Flags // ' ' &
(189)         groupby( Bin ) &
(190)         Command= 'ld -o' // Bin // ' '
              // concatenate(FF).
(191)     set( ogroup, o )<-
(192)         is( O, o_file ).
(193)     is( O, o_file )<-
(194)         is( C, c_file )&
(195)         change_extension( C, '.c', O, '.o,' ) &
(196)         derivation( straight, C, O, _, _ ).
(197)     %compiling c_files to o_files.
(198)     derivation( straight, C, O, Command )<-
(199)         is( C, c_file )&
(200)         change_extension( C, '.c', O, '.o' ) &
```

```
(201)    env( cc, CC ) &
(202)    env( cflags, F )&
(203)    FF=' // F // ' &
(204)    groupby( C ) &
(205)    Command=
(206)    CC // '-o' // O // '-c sun4' //
             concatenate (FF) // C.
(207)    %yacc rules
(208)    derivation( widen, Yacc, yacc_group,
             Command ) <—
(209)    is( Yacc, yacc_file )&
(210)    Command='yacc '//Yacc.
(211)    is( 'y.tab.c', c_file )<—
(212)        is( _, yacc_file ).
(213)    is( 'y.tab.h', h_file )<—
(214)        is( _, yacc_file ).
(215)    set( yacc_group, 'y.tab.c' ).
(216)    set( yacc_group, 'y.tab.h' ).
(217)    is( 'lex.yy.c', c_file )<—
(218)        is( _, lex_file ).
(219)    derivation( straight, Lex, 'lex.yy.c',
             Command )<—
(220)    is( Lex, lex_file )&
(221)    Command='lex ' // Lex.
(222)    change_extension( From, F_ext, To, T_ext )<—
(223)    From=Stem // F_ext &
(224)    To=Stem // T_ext. }
```

Line 150 defines the module as "stdc" (a standard C rule set). The module has four import predicate arguments: "env_in" "env_control" "is_in" and "date_in". The first two import predicate arguments are obtained from the module "environment" and the second two import predicate arguments are obtained from the "src" module. Line 151 defines four export predicate arguments: "is", "date" "derivation", and "set".

Lines 152 through 160 describe rules to establish the final build environment. For example, lines 152 through 154 establish that the environmental control should be established by the union of the imported values ("env_in") and the local values ("env_local"). Lines 155–157 establish that the environment should use local values, and lines 158–160 define an override such that local variables are ignored and the passed-in values are used.

Lines 161 and 162 explicitly define existing files (a file exists if it is an "is_in" predicate). Lines 163 to 166 define flags to be used for "yacc" and "lex" files. Lines 167 and 168 explicitly define date information after it is passed by "date_in". Lines 169 through 171 assign a date of zero if a file is derived and has not yet been produced (such as an object file). Lines 172 through 179 define derived predicates. Specifically, lines 172 through 173 define derived object files and lines 174 through 175 define derived binary files. Lines 176 through 177 establish that files from a YACC compiler, which always have the "y.tab.c" name, are defined as derived "C" files. Similarly, lines 178 through 179 establish that files from the lex compiler, which always have the "lex.yy.c" name, are defined as derived "C" files.

Lines 180 through 190 define binary (executable) files and how to create them. This code establishes the updated executable program. Lines 180 through 182 show that the binary file is composed of derived object files. Line 183 matches the derivation statement of line 182. Line 184 looks for the "ogroup" file set (all of the object files). Line 185 concatenates the names of the identified object files.

Lines 191 through 206 define objects files and how to create them. Lines 193–196 establish that an object file exists if there is a file that is a "c" file (line 193), the file has an extension that can be changed (line 194), and there is a straight derivation from "C" to "O". The straight derivation is defined at lines 198–206.

Lines 208 through 216 define "yacc" files and how to compile them. The derivation of a "yacc" file is shown at lines 208 through 210. The derivation is that if there is a "yacc" file (line 209), then to compile it, a "yacc" command is placed in front of the file name (line 210).

Lines 211–212 establish that if there is a "yacc_file", then there will be a file called "y.tab.c". Similarly, lines 213–214 establish that if there is a "yacc_file", then there will be a file called "y.tab.h". Lines 215 and 216 add the "y.tab.c" and the "y.tab.h" files to a "yacc_group".

Lines 217 through 221 define "lex" files and how to compile them. Lines 217 and 218 establish that there is a "lex.yy.c" file if there is alex file. Lines 219–221 provide the derivation rules (the command "lex" is placed before the lex file name).

Lines 222 and 224 define a utility predicate and how to handle naming conventions. The rules utilize string concatenation to take an ending of a file name and place a new name on the file. Note that "//" is the string concatenation operator (i.e., a//b=ab).

A second-order operation module 58 may now be defined in relation to the foregoing second-order system model 56 and the second-order inference structure 60. For example, the following code will return the names of all derived files, together with the commands that created them. In other words, the following code will return the names of the commands necessary to rebuild an updated executable program.

```
(250)    module src( :Inputs, Dates ) &
(251)    module environment(:Env, Envc ) &
(252)    module stdc( Env, Envc, Inputs, Dates:
(253)        Created, _, Derivation, _) &
(254)    Created( New_name, _ ) &
(255)        Derivation( _, _, New_name, Command ).
```

Line 250 is a call to the "src" module and line 251 is a call to the "environment" module (the second-order system models). Line 252 is a call to module "stdc" (second-order inference structure). The "created" predicate at line 254, which is obtained from the "stdc" module, is used to obtain the names of the created objects (files). The "Derivation" predicate at line 255, which is also obtained from the "stdc" module, is used to identify the command that is necessary to reproduce each created file.

The foregoing second-order operation module 58 (lines 250–251), second-order inference structure 60 (lines 150–224), and second-order system model 56 (lines 100–128) are applied to the transformation engine 62 to form a first-order description of the system model, as previously described. The first-order description is applied to the query engine 66 to produce the following set of system construction commands 68.

| Name | Command |
|---|---|
| (270)cli.o | /bin/acc -o cli.o -c sun4 -Xs -g cli.c |
| (271)Unix.o | /bin/acc -o cli.o -c sun4 -Xs -g Unix.c |
| (272)y.tab.c | yacc aa.y |
| (273)y.tab.h | yacc aa.y |
| (274)y.tab.o | /bin/acc -o cli.o -c sun4 -Xs -g y.tab.c |
| (275)lex.yy.c | lex bb.l |
| (276)lex.yy.o | /bin/acc -o cli.o c sun4 -Xs -g lex.yy.c |
| (277)cli | ld -o cli cli.o Unix.o y.tab.o lex.yy.o -lce -ldl -ll -ly |

Figure 10:
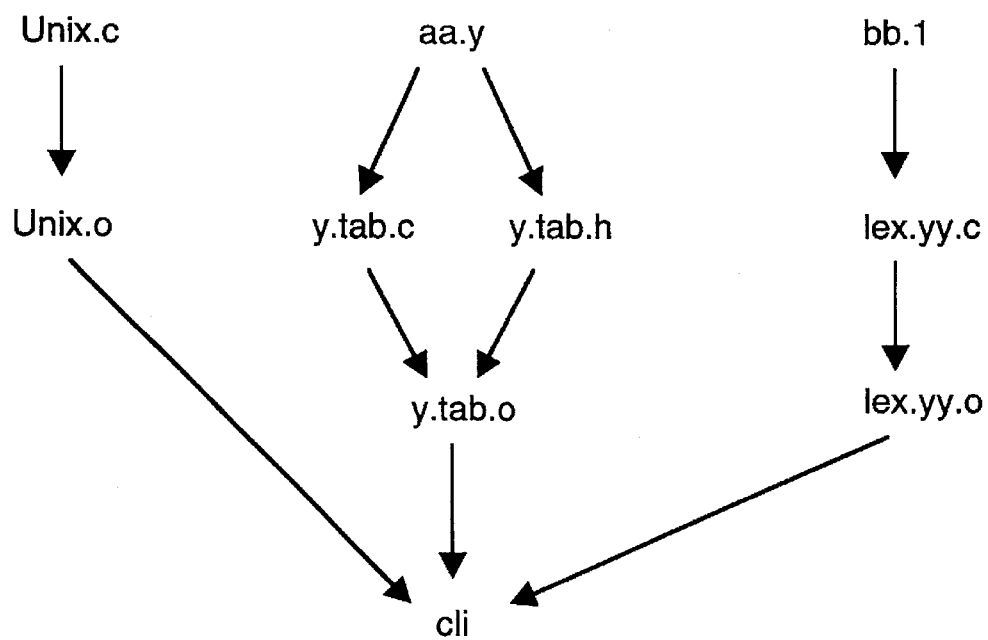
FIG. 10 depicts the relations between files derived in accordance with an example illustrating the present invention.

Line 277 is the file name for the new binary (executable) file. Note that the command to produce the file includes a number of object files "cli.o", "Unix.o", "y.tab.o", and "lex.yy.o". The relation of the "cli" binary file to its parent object files is shown in FIG. 10. FIG. 10 illustrates that the object file "Unix.o" is derived from the file "Unix.c". "Unix.c" is an input file, as defined at line 105; its derivation to an object file is established through lines 198–206. FIG. 10 also demonstrates that the object file "y.tab.o" descends from a file called "y.tab.c". The same derivation rules as in the case of "Unix.c" are used. The files "y.tab.c" and "y.tab.h" are derived from the file "aa.y". File "aa.y" is declared at line 107 as a "yacc" file. Lines 211–214 assign each "yacc" file as a "y.tab.c" file and a "y.tab.h" file.

The "lex.yy.o" file is derived from "lex.yy.c", which is derived from "bb.1", as shown in FIG. 10. The file "bb.1" is declared at line 111. The lex compilation rules at lines 217–221 yield the "lex.yy.c" file. Lines 191 through 206 are used to create the "lex.yy.o" object file.

The information at lines 270–277 (system construction commands) may be displayed through the user interface 26. In addition, the system construction commands are used by the tool controller 38 as it operates with the compilers 40 and linkers 42 to transform the existing program files 44 into an updated executable program 46.

Those skilled in the art will recognize a number of advantages associated with the apparatus and method of the invention. First, the present invention provides the ability to automatically identify the interdependencies between files and assign file names for derived files. This capability does not exist in prior art systems, where all file interdependencies and file names must be explicitly declared through a set of rules. With the present invention, a programmer only needs to define the input files and their relations, the steps to build the desired object are automatically executed. The declaration of import predicate arguments and export predicate arguments allows errors to be found at compile time, instead of at execution time. Finally, the invention has provided a mechanism to exploit second-order logic without suffering from the computational penalties associated with second-order logic.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

I claim:

1. A computer readable memory to direct a computer to function in a specified manner, comprising:

executable instructions stored in said memory, said executable instructions including a second-order logic system description including:

a second-order system model that defines a set of existing source code program files stored in said memory, a second-order rule set that defines a set of software system management operations that can be performed on said set of existing source code program files, and a second-order operation module that specifies a desired software system management operation to be executed in accordance with said second-order rule set on said set of existing source code program files, wherein said executable instructions of said second-order logic system description include instructions specifying variable functors with specified import predicate arguments and export predicate arguments; and wherein said second-order logic system description directs said computer to produce system construction commands that are used to create and name a set of intermediate object code files that are used to generate an executable program from said set of existing source code program files.

2. The computer readable memory of claim 1 wherein said existing program files stored in said memory include a first set of program files and a second set of program files, said first set of program files including executable instructions to perform the operation of a tool controller interacting with a plurality of compilers, linkers, and said second set of program files, said tool controller processing said system construction commands to transform said second set of program files into said executable program.

3. The computer readable memory of claim 1 wherein executable instructions of said second-order logic system description further include transformation engine executable instructions used to transform said second-order system model into a first-order system model.

4. The computer readable memory of claim 3 wherein said transformation engine executable instructions include Prolog interpreter instructions that process said first-order system model to generate said system construction commands.

5. The computer readable memory of claim 3 wherein said first order system model includes a data structure specifying a module name, import predicate arguments, export predicate arguments, internal predicates, a functor, and term arguments.

6. The computer readable memory of claim 5 wherein said import predicate arguments include a data structure that specifies a module name, import predicate variables, export arguments, local predicates, and a predicate functor.

7. A computer readable memory storing a first set of instructions that are executed by a computer to form a tool controller which interacts with a plurality of compilers, linkers, and source code program files to transform said source code program files into an executable program, comprising:

executable instructions stored in said computer readable memory as a second set of instructions that are executed by said computer to form:

a second-order rule set defining a set of processing operations performed on said source code program files, and a user interface
- to define a second-order system model that specifies said source code program files, and
- to select a desired second-order processing operation to be executed on said source code program files to from a set of system construction commands that are applied to said tool controller, wherein said second-order rule set, said second-order system model, and said second-order processing operation of said executable instructions include instructions specifying import predicate arguments and export predicate arguments.

8. The computer readable memory of claim 7 wherein said second-order rule set, said second-order system model, and said second-order processing operation produce a first set of executable commands to create and name a set of intermediate object files that are used to change said source code program files into an executable program.

9. The computer readable memory of claim 7 wherein said second set of instructions further include transformation engine instructions used to transform said second-order system model into a first-order system model.

10. The computer readable memory of claim 9 wherein said transformation engine instructions include Prolog interpreter instructions that process said first-order system model to generate said system construction commands.

11. The computer readable memory of claim 9 wherein said first order system model includes a data structure specifying a module name, import predicate arguments, export predicate arguments, internal predicates, a functor, and term arguments.

12. The computer readable memory of claim 11 wherein said import predicate arguments include a data structure that specifies a module name, import predicate variables, export arguments, local predicates, and a predicate functor.

13. A method executed by a computer under the control of a program, said computer including a memory for storing said program, said method comprising the steps of:

receiving in said computer a second-order logic system description including variable functors with specified import predicate arguments and export predicate arguments, said second-order logic system description further including
- a second-order system model that defines a set of existing source code program files,
- a second-order rule set that defines a set of operations that can be performed on said set of existing source code program files, and
- a second-order system query that specifies a desired operation to be executed by said second-order rule set on said set of existing source code program files;

applying said second-order logic system description to a query engine running on said computer system to generate system construction commands; and executing said system construction commands on said computer system to form a set of intermediate object code files that are used to generate an executable program from said set of existing source code program files.

14. The method of claim 13 wherein said executing step includes the steps of
- running a first set of program files on said computer system to form a tool controller interacting with a plurality of compilers and linkers; and
- using said tool controller to process said system construction commands in relation to said existing program files to form said executable program.

15. The method of claim 13 wherein said applying step includes the step of transforming said second-order system model into a first-order system model.

* * * * *